(12) United States Patent
Anders et al.

(10) Patent No.: US 10,554,613 B2
(45) Date of Patent: *Feb. 4, 2020

(54) DYNAMIC HASHTAG ORDERING BASED ON PROJECTED INTEREST

(71) Applicant: International Business Machines Corporation, Armonk, NY (US)

(72) Inventors: Kelley L. Anders, East New Market, MD (US); Jonathan Dunne, Dungarvan (IE); Robert H. Grant, Atlanta, GA (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,249

(22) Filed: Jun. 25, 2019

(65) Prior Publication Data
US 2019/0312834 A1 Oct. 10, 2019

Related U.S. Application Data

(63) Continuation of application No. 15/406,352, filed on Jan. 13, 2017, now Pat. No. 10,375,005.

(51) Int. Cl.
*H04L 12/58* (2006.01)
*H04L 29/08* (2006.01)

(52) U.S. Cl.
CPC .............. *H04L 51/32* (2013.01); *H04L 51/16* (2013.01); *H04L 67/306* (2013.01)

(58) Field of Classification Search
CPC .......... G06F 17/30867; G06F 17/3033; G06F 17/2705; H04L 67/02; H04L 67/22;
(Continued)

(56) References Cited

U.S. PATENT DOCUMENTS 9,384,259 B2 7/2016 Wexler et al.
10,375,005 B2 * 8/2019 Anders ................. H04L 67/306
(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.
(Continued)

*Primary Examiner* — Angela A Armstrong
(74) *Attorney, Agent, or Firm* — Heslin Rothenberg Farley & Mesiti P.C.; Michael O'Keefe, Esq.

(57) ABSTRACT

A method, computer program product, and system includes a processor(s) obtaining a hashtag and analyzing the hashtag to identify components comprising the hashtag. The processor(s) generate sub-hashtags, where each of the sub-hashtags includes at least one component. The processor(s) obtain, over an Internet connection, via a user interface of a social media platform displayed on a first computing resource, an entry by a user comprising text and the hashtag. The processor(s) obtains from a second computing resource, a request from a second user to access the entry that includes parameters of the second user on the platform. The processor(s) determine that a sub-hashtag is most relevant to the second user. The processor(s) configure instructions to display a customized entry, where the customized entry includes the text and the relevant sub-hashtag for the second user. The processor(s) instruct the second computing resource to display the customized entry in its user interface.

20 Claims, 8 Drawing Sheets

(58) Field of Classification Search
CPC ....... H04L 51/32; H04L 67/306; H04L 51/16; G06Q 50/01
See application file for complete search history.

(56) References Cited

U.S. PATENT DOCUMENTS

| | | |
|---|---|---|
| 2012/0158863 A1 | 6/2012 | Kikin-Gil et al. |
| 2016/0117063 A1 | 4/2016 | Fuller |
| 2017/0161356 A1 | 6/2017 | Qu et al. |
| 2018/0203841 A1 | 7/2018 | Anders et al. |

OTHER PUBLICATIONS

List of IBM Patents or Patent Applications Treated as Related, Jun. 25, 2019, 2 pages.

* cited by examiner

US 10,554,613 B2

DYNAMIC HASHTAG ORDERING BASED ON PROJECTED INTEREST

BACKGROUND

Hashtags are a universally recognized way of connecting items on social media and are used to map social output to ideas and concepts. Currently, hashtags require a significant amount of precision to work correctly. If related terms are used in a "tweet" or other social channel, there is no way to link the hashtags easily as separate concepts, or to process their relationships as compilations. Also, between different groups, hashtags can mean slightly different things and occasionally people can even misinterpret their meanings. Thus, hashtags are likely far less effective than intended for aggregating sentiments on similar subjects into effective conversations and information repositories.

SUMMARY

Shortcomings of the prior art are overcome and additional advantages are provided through the provision of a method for dynamically generating and displaying a customized hashtag. The method includes, for instance: obtaining, by one or more processors, over a communications connection, a hashtag; identifying, by the one or more processors, at least two linguistic components comprising the hashtag; generating, by the one or more processors, at least two sub-hashtags, wherein each of the at least two sub-hashtags comprises at least one linguistic component of the at least two linguistic components; obtaining, by the one or more processors, over an Internet connection, via a user interface of a social media platform displayed on a first computing resource, an entry by a user comprising text and the hashtag; obtaining, by the one or more processors, over the Internet connection, from a second computing resource accessing the social media platform, a request from a second user to access the entry, wherein the request comprises parameters of a profile of the second user on the social media platform; determining, by the one or more processors, that a sub-hashtag of the at least two sub-hashtags is most relevant to the third user, wherein the determining comprises: inferring relationships between the parameters of the profile of the third user and the at least two linguistic components, and selecting the sub-hashtag associated with a more significant relationship of the inferred relationships; configuring, by the one or more processor, instructions to display a customized entry, wherein the customized entry comprises the text and the relevant sub-hashtag for the second user; and instructing, by the one or more processors, over the Internet connection, based on the instructions, the second computing resource to display the customized entry in the user interface of the second computing resource, wherein based on the instructing, the second computing resource displays the customized entry in the user interface of the second computing resource.

Shortcomings of the prior art are overcome and additional advantages are provided through the provision of a computer program product for dynamically generating and displaying a customized hashtag. The computer program product comprises a storage medium readable by a processing circuit and storing instructions for execution by the processing circuit for performing a method. The method includes, for instance: obtaining, by one or more processors, over a communications connection, a hashtag; identifying, by the one or more processors, at least two linguistic components comprising the hashtag; generating, by the one or more processors, at least two sub-hashtags, wherein each of the at least two sub-hashtags comprises at least one linguistic component of the at least two linguistic components; obtaining, by the one or more processors, over an Internet connection, via a user interface of a social media platform displayed on a first computing resource, an entry by a user comprising text and the hashtag; obtaining, by the one or more processors, over the Internet connection, from a second computing resource accessing the social media platform, a request from a second user to access the entry, wherein the request comprises parameters of a profile of the second user on the social media platform; determining, by the one or more processors, that a sub-hashtag of the at least two sub-hashtags is most relevant to the third user, wherein the determining comprises: inferring relationships between the parameters of the profile of the third user and the at least two linguistic components, and selecting the sub-hashtag associated with a more significant relationship of the inferred relationships; configuring, by the one or more processor, instructions to display a customized entry, wherein the customized entry comprises the text and the relevant sub-hashtag for the second user; and instructing, by the one or more processors, over the Internet connection, based on the instructions, the second computing resource to display the customized entry in the user interface of the second computing resource, wherein based on the instructing, the second computing resource displays the customized entry in the user interface of the second computing resource.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
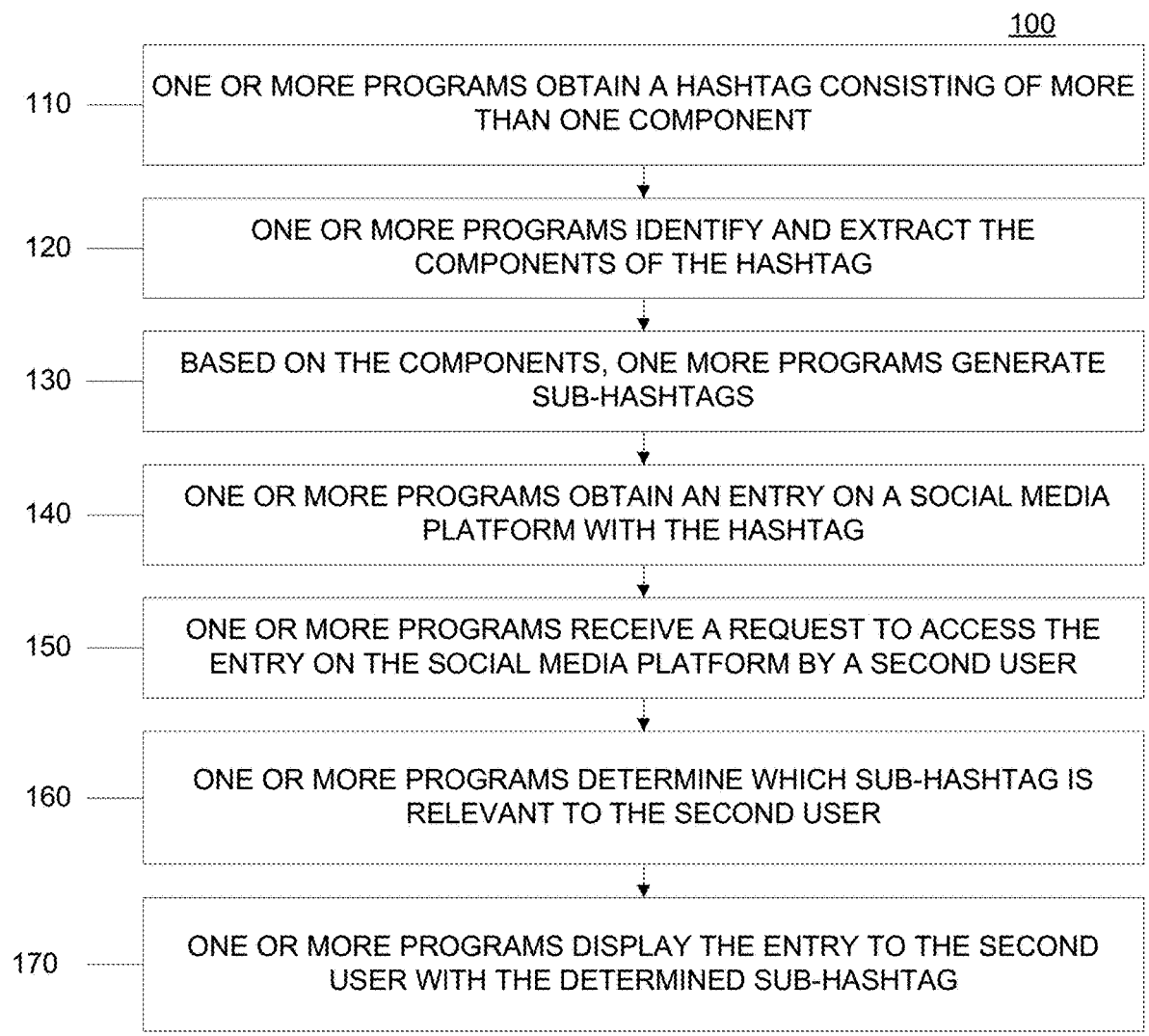
FIG. 1 is a workflow illustrating certain aspects of embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
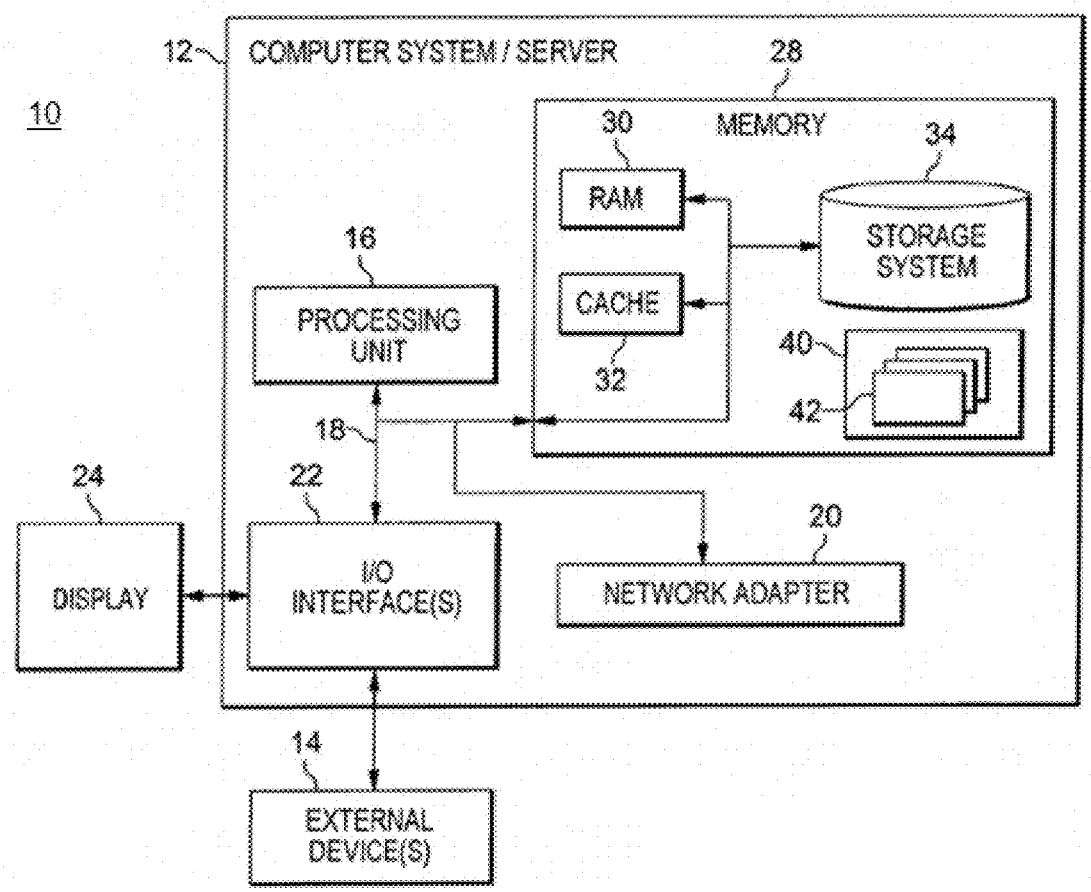
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Hashtags are keywords that are found within the body of text or added to the end of updates in entries or postings on various social media platforms. Placing a "#" symbol before a keyword signifies that it is a hashtag. Hashtags provide a gateway to searching social media in the same way that keywords are aids to searching websites and databases. On social media, users can add hashtags to text, video and/or image updates. Hashtags can be single words (e.g., #dog) or two or more words put together with no spacing between the individual words (e.g., #dogshow).

Using hashtags in posts on social media sites allows like content to be aggregated, which can provide various benefits to social media users, as well as to the creators of the content. For example, consistent use of hashtags can enable a social media user to increase viewership of his or her content. For example, when a user performs a search using words that are similar to keywords, the search can assist the user in discovering relevant content. Content located in such a search can then become part of a trending conversation, which affords a content owner increased viewership of his or her content.

Hashtags can also assist a content owner in a commercial context because increasing the visibility of content can help a content owner promote a point of view, brand and/or product. For example, using hashtags in social media enables a user to build followers. A self-styled authority on a certain subject, such as stain removal, can use hashtags to help users find this authority's content, for example, when engaged with multiple users in a conversation. A user can also utilize hashtags to generate new prospects and create new customers. A user can monitor a relevant sub-set of hashtags and utilize these tags to navigate through different conversations and to different social media platforms, in order to recognize relevant opportunities. For example, a user who is a tailor could use a subset of hashtags related to crafting in order to find users in need of custom tailoring for clothing. Certain hashtags will trend at various times, so a user can monitor hashtags that are currently prevalent to recognize customers with a present need for services. This individual could use a similar set of hashtags to track competition.

Hashtags organize conversations around subjects. If a user searches a social medium platform, including but not limited to, Twitter based on the hashtag "#barbecue" the search results would bring up the most recent conversations on the subject. A user could save this search for reference later, discover people to follow, and/or answer a question someone has on how to best barbecue fish on a grill. By searching on a hashtag, a user can convert a solitary web surfing experience into a virtual crowded room of people shouting into an organized chorus.

In order to experience the organizational benefits provided by hashtags on social media, the hashtags themselves must be reliable in identifying related content. However, because creating hashtags is manual, issues exist with the quality of the hashtags that are created, making it difficult to find and unite users and content under relevant tags. Various embodiments of the present invention may address this shortcoming by providing systems, computer program products, and methods that connect multiple hashtag concepts, display one or many hashtags, consider the user who is viewing a tag when configuring a tag display, and enable efficient evaluation of relationships.

In order to address inconsistencies created by manual tagging and to provide more meaningful connections between media and users on social media platforms, embodiments of the present invention dynamically compile and create a combination (compilation) or "mashup" hashtag, that can be split into sub-hashtags, which display different hashtags based on the preferences/history for a particular user. In an embodiment of the present invention, one or more programs executed by at least one processor, generate a combination hashtag that contains two or more related concepts, in the form of a singular hashtag. However, when a given user views this mashup hashtag in a social media environment, the mashup hashtag appears to this user as being reduced to a sub-hashtag, i.e., one of the hashtags that comprises the mashup. The sub-hashtag that appears is based on one or more programs analyzing the historical preferences of the user, as indicated, in one non-limiting example, in the user's profile. To this end, in some embodiments of the present invention, one or more programs perform one or more of the following functions: 1) receive a hashtag; 2) identify components comprising the hashtag; 3) generate stand-alone sub-hashtags based on the components; 4) determine and rank a user's preferences; 5) select the hashtag component combination that has the highest alignment with the user's highest ranked preference(s); and 6) substitute the hashtag with a sub-hashtag, formed by the selected component combination (in media viewed by the user, including communications with the user, such as messages to the user on a social media platform).

Embodiments of the present invention may include various aspects that provide advantages over existing hashtag-related technologies. For example, in embodiments of the present invention, one or more programs executed by at least one processing circuit dynamically compile and then create a compilation or mashup hashtag that can be split into sub-hashtags. The one or more programs then display different hashtags based on preferences and/or history for that particular user, who is viewing a given entry on a social media platform. Embodiments of the present invention also represent a customization that is specifically relevant to hashtags. Further, in embodiments of the present invention, one or more programs can automatically and dynamically select and group hashtags.

Aspects of certain embodiments of the present invention are directed to implementing certain improvements to social media platforms in order to enable more effective messaging, communications, and connections, through social media. This solution is enabled specifically by the utilization of the technology, including but not limited to, segmentation of hashtags and customized display of segments of the hashtags, based on individual user preferences and/or history, which can be encompassed in parameters of the user's social media profile. This dynamic hashtagging of elements of social media increases the quality of hashtagging and enables more efficient and effective content aggregation and user communication. An advantage of aspects of embodiments of the present invention, is that these embodiments provide a method, computer program product, and system for extending functionality of social media platforms to optimize content aggregation and user communication. This advantage is inextricably tied to computing at least because this aspect improves the efficiency of social media as an electronic communication tool by implementing specific functionality to facilitate electronic communication in a given environment. By implementing a type of hashtag quality assurance and flexibility, some embodiments of the present invention enable efficiencies that were formerly not possible. Thus, some embodiments of the present invention use dynamic hashtags and sub-hashtags, in accordance with user preferences and history on social media platforms, to improve the efficacy of the platforms themselves.

In an embodiment of the present invention, one or more programs exploit principal component analysis (PCA), which is a statistical procedure, to determine a related set of concepts or components to generate sub-hashtags from a parent concept (e.g., the full hashtag). PCA comprises an orthogonal transformation to convert a set of observations of possibly correlated variables into a set of values of linearly uncorrelated variables called principal components. The number of principal components is less than or equal to the number of original variables. Thus, in an embodiment of the present invention, the program code exploits a parent concept to generate multiple sub-hashtags. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables.

As aforementioned, in an embodiment of the present invention, one or more programs generate a mashup hashtag that contains two or more related concepts in the form of a singular hashtag (e.g., #July4barbequetips2016). When a particular user views the hashtag in a social media environment, the compilation hashtag is reduced to a subset hashtag that would most resonate with the viewer, based on a profile of the user, including the user's history and preferences. However, when the originating user views the hashtag, the user can view the hashtag analytics in a form that displays both cumulative concepts and sub-concepts. These components and sub-components are also referred to as components, as they can be semantic and/or linguistic components, including but not limited to, words, abbreviations of words, slang representations of words, of varied lengths, including single letters. The components and sub-components utilized in aspects of embodiments of the present invention have meaning and are comprehended when used in oral and/or written communication.

In an embodiment of the present invention, one or more programs continuously track the ongoing relationship between the compilation hashtag and sub-concepts. By generating a hashtag and displaying the hashtag differently based on user parameters (e.g., profile, preferences, history, etc.), the displayed hashtag is customized to resonate with the user more specifically than the original, arguably more general, hashtag, would have resonated. The customization of the hashtag by the one or more programs impacts user interaction and enables greater user participation in social media platforms. Business users could also benefit from this customization as the one or more programs would produce more comprehensive analytics by tracking the ongoing relationship between the compilation hashtag and sub-concepts. For example, based on the tracking data, the one or more programs could provide business users with a comprehensive range of statistics without utilizing more involved (and potentially expensive) trend analysis tools.

FIG. 1 is a workflow 100 illustrating aspects of an embodiment of the present invention. In an embodiment of the present invention, one or more programs executed by one or more processors obtain a hashtag consisting of more than one component (110). In an embodiment of the present invention, the one or more programs obtain the hashtag over an Internet connection. The one or more program may obtain the hashtag from an entry of a user in a user interface of a social media platform. In an embodiment of the present invention, the component is a concept. For example, the one or more programs may obtain the hashtag #IBMCloudInterConnect2017. IBM® is a registered trademark of International Business Machines Corporation, Armonk, N.Y., US. IBM InterConnect 2017 is a conference that is hosted by IBM® that is scheduled to provide hands-on training around certain cloud computing technologies, among other technologies.

In an embodiment of the present invention, one or more programs identify and extract the components of the hashtag (120). In an embodiment of the present invention, the one or more programs extract the components of the hashtag by executing one or more natural language processing (NLP) algorithms. Each sub-hashtag includes a portion of the hashtag and there can be overlaps between the portions. By executing NLP, the program code directs artificial intelligence and/or computational linguistics to identify the combination(s) of words that comprise the components of the hashtag.

Figure 2:
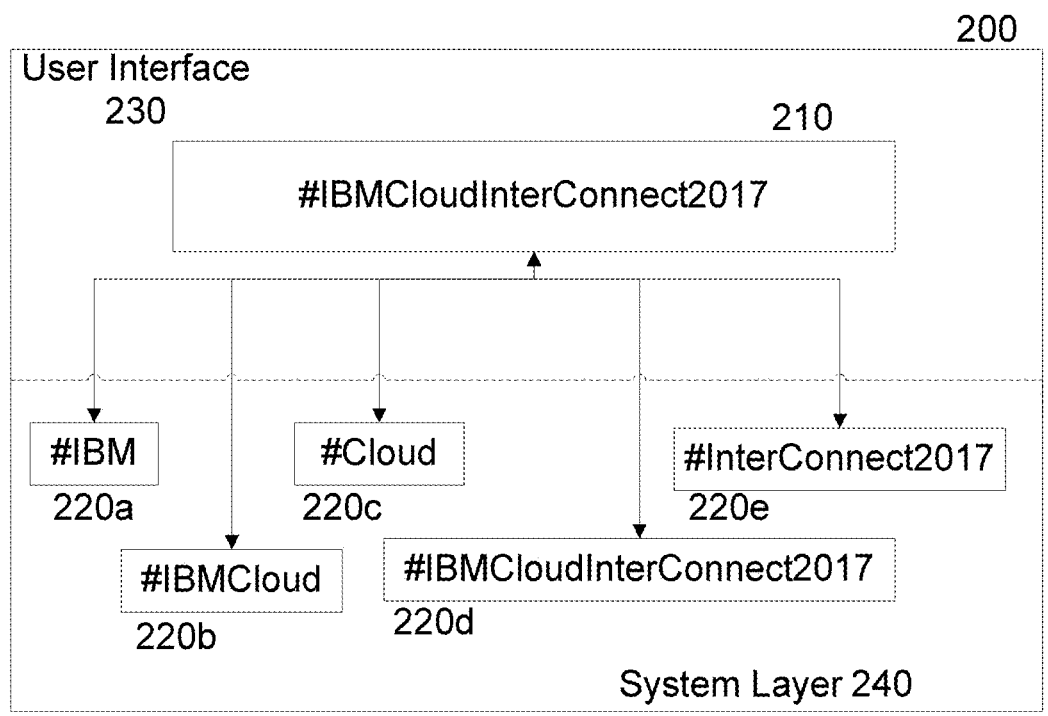
FIG. 2 is an illustration of certain aspects of embodiments of the present invention.

In an embodiment of the present invention, based on the components, the one or more programs generate sub-hashtags (130). Thus, the one or more programs identify the hashtag as a combination of other hashtags and dynamically split the hashtag. FIG. 2 is an example 200 of how one or more programs in an embodiment of the present invention extract components from the hashtag, to generate multiple sub-hashtags.

As illustrated in FIG. 2, one or more programs obtain a hashtag, #IBMCloudInterConnect2017 210. From this hashtag 210, the one or more programs generate five sub-hashtags 220a-220e (the number of hashtags generated is offered as a non-limiting example). The sub-hashtags 220a-220e in this example are #IBM 220a, #IBMCloud 220b, #Cloud 220c, #InterConnect2017 220d, and #IBMInterConnect2017 220e.

As illustrated in FIG. 2 (as well as in FIG. 1), in an embodiment of the present invention, the one or more programs obtain the hashtag 210 via user entry in a user interface 230 of a computing resource (e.g., FIG. 1, 110). For example, a user may include the hashtag in a message. In an embodiment of the present invention, by entering the message with the hashtag, the user sends the message to a social media outlet, where the hashtag is processed and decomposed into sub-hashtags. To decompose the hashtag into sub-hashtags (e.g., FIG. 1, 120-130), in an embodiment of the present invention, the one or more programs that obtain the hashtag 210 execute at a system layer 240. At the system layer 240, the one or more programs generate the sub-hashtags 230 and in an embodiment of the present invention, while continuing to display the hashtag on the user interface 230, such that the hashtag 210 remains composed on the user interface layer 230, the one or more programs link each element comprising the sub-hashtags 220a-220e, to a back end.

Returning to FIG. 1, in an embodiment of the present invention, the one or more programs obtain an entry (e.g., a posting and/or a message) on a social media platform with the hashtag (140). In an embodiment of the present invention, a user interacts with the social media platform over a communications connection and utilizes, for example, the Internet. In an embodiment of the present invention, the user may utilize a mobile device to interact with the social media platform and the one or more programs generate a user interface (e.g., a thin client), through which the one or more programs obtain an entry from a user. In an embodiment of the present invention, the one or more programs evaluate parameters of the entry of the user and suggest the hashtag to the user. In another embodiment of the present invention, the one or more programs automatically populate the hashtag upon evaluating the parameters of the entry.

The one or more programs receive a request to access the entry on the social media platform by a second user (150). In an embodiment of the present invention the one or more programs determine that the request originated from a new user. For example, the one or more programs may verify that the request originates from a different account and/or profile on the social media platform than the account and/or profile of the entry. However, the one or more programs may also query elements of the Internet of Things (IoT) to identify the second user. Embodiments of the present invention utilize aspects of the IoT and smart sensors within a communications network to develop and implement a more efficient approach to identifying individuals utilizing social media platforms. As understood by one of skill in the art, the IoT is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Because the smart sensors carry unique identifiers, a computing system that communicates with a given sensor can identify where the source of the information. Thus, in certain embodiments of the present invention, the one or more programs can identify the second user by locating a smart sensor, such as an RFID, within the vicinity of this user and communicating over an Internet connection with the smart sensor, to obtain information identifying the user.

Returning to FIG. 1, in some embodiments of the present invention, the one or more programs determine which sub-hashtag is relevant to the user by locating a profile of the second user, based, for example, on identifying the second user and scrutinizing the profile (160). In some embodiments of the present invention, one or more programs determine that a sub-hashtag is (most) relevant to a user by inferring relationships between parameters a profile of the user and each of the components of the hashtag. The one or more programs may then select the sub-hashtag associated with a more significant relationship of the inferred relationships.

Referring to FIG. 1, the one or more programs display the entry to the second user with the determined sub-hashtag (170). In an embodiment of the present invention, the one or more programs display the entry on the user interface of the social media platform. In an embodiment of the present invention, the one or more programs identify the user, for example, based on cookies, login information, and/or other data available from the social media platform and/or the browser utilized to display the user interface, to customize the display of the hashtag for the second user. When the user requests to view the entry, this information, based upon which the one or more programs identify the user, may be part of the request.

In some embodiments of the present invention, in order to display the entry to the second user with the determined sub-hashtag (170), the one or more programs configure instructions to display the entry to the user with the sub-hashtag. Over an Internet connection, the one or more programs instruct the second computing resource to display the entry with the sub-hashtag (to the second user).

In certain embodiments of the present invention the one or more programs execute on a single computing node, including but not limited to, on a personal computing devices, such as a smartphone. In these embodiments of the present invention, one or more programs: obtain a hashtag consisting of more than one component; identify and extract the components of the hashtag; generate sub-hashtags; obtain an entry on a social media platform with the hashtag; receive a request to access the entry on the social media platform by a second user; determine which sub-hashtag is relevant to the second user; and display the entry to the second user with the determined sub-hashtag, all on this computing device.

Thus, using both FIG. 1 and FIG. 2 to illustrate aspects of an embodiment of the present invention, when the original user described in FIG. 1 views his or her entry on the social media platform, the one or more programs display the hashtag 210 (FIG. 2). However, when the second user described in FIG. 1 views the entry, the one or more programs select and display a sub-hashtag 220a-220e. For example, instead of viewing the hashtag #IBMCloudInterConnect2017, in accordance with the determination of the one or more programs, the second user may view the entry with #InterConnect2017 instead of the original (mashup) hashtag. FIG. 1 includes two users as an example, however, the one or more programs in an embodiment of the present invention repeat determinations of relevant sub-hashtags to display, on a dynamic and custom basis, for multiple users. For example, an initial user may post the entry: "Come see exciting news at #IBMCloudInterConnect2017." The one or more programs may display this post to another user as: "Come see exciting news at #IBMCloud." The one or more programs may display this post to another user as "Come see exciting news at #InterConnect2017." In an embodiment of the present invention, the one or more programs can alter the ordering, as well as the sub-hashtag display, to ensure closeness to user preferences.

Figure 3:
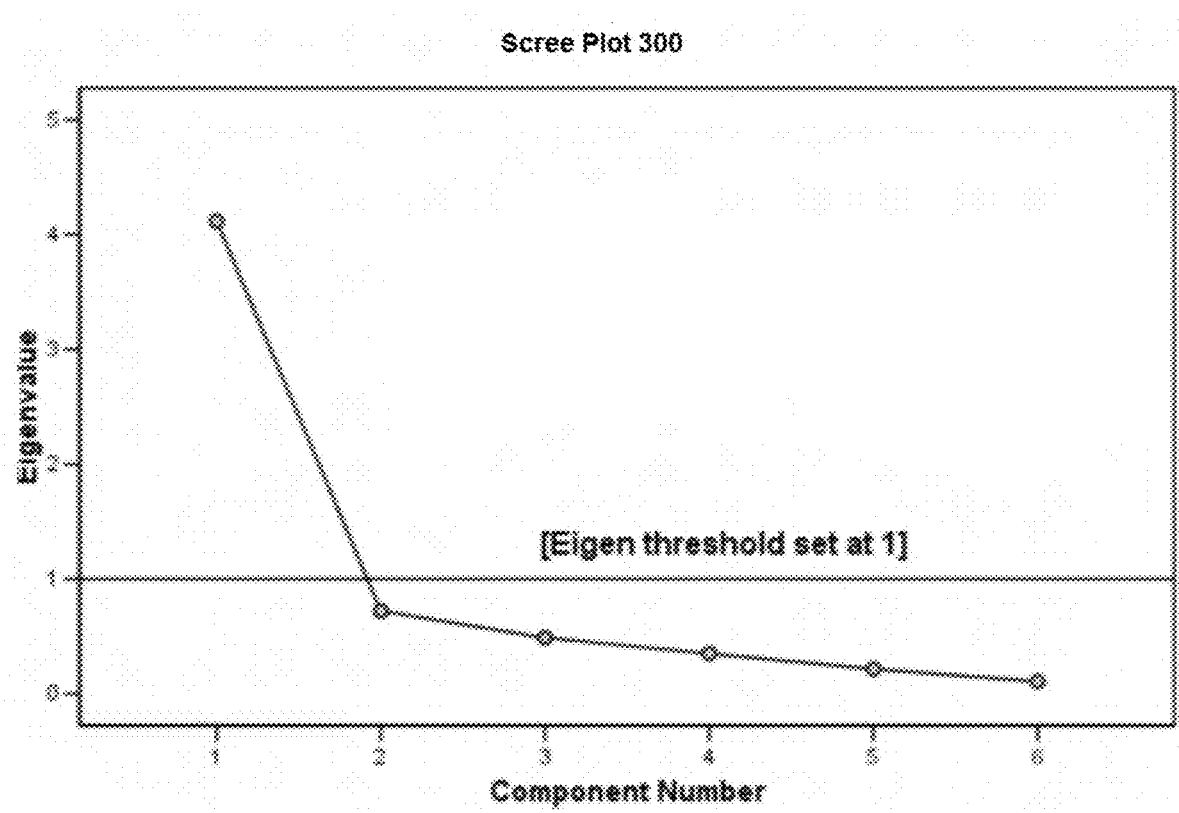
FIG. 3 is a scree/elbow plot that can be utilized to graphically illustrate which sub-hashtags have the highest variance, in accordance with one or more aspects of embodiments of the present invention.

Returning to FIG. 1, in an embodiment of the present invention, the one or more programs executed a PCA to determine which sub-hashtag is relevant to the user (160). In the PCA, the one or more programs determine which term in the hashtag (e.g., FIG. 2, 210) is most representative of an overall area of interest for a particular user. The user profile may include a cumulative understanding of the interests of the user. Interests of a given user may be based on history, preferences, etc. The one or more programs utilize this data to infer which components (e.g., FIG. 2, 220a-220e) have the highest variance and the one or more programs determine an order for the terms. FIG. 3 is a scree/elbow plot 300 that can graphically illustrates which sub-hashtags (e.g., terms, components) have the highest variance, in one non-limiting example. In certain embodiments of the present invention, the one or more programs utilize the co-variance of a singular term over time to determine which tuples/series of tags are best representative of a given area of interest for a user.

Figure 4:
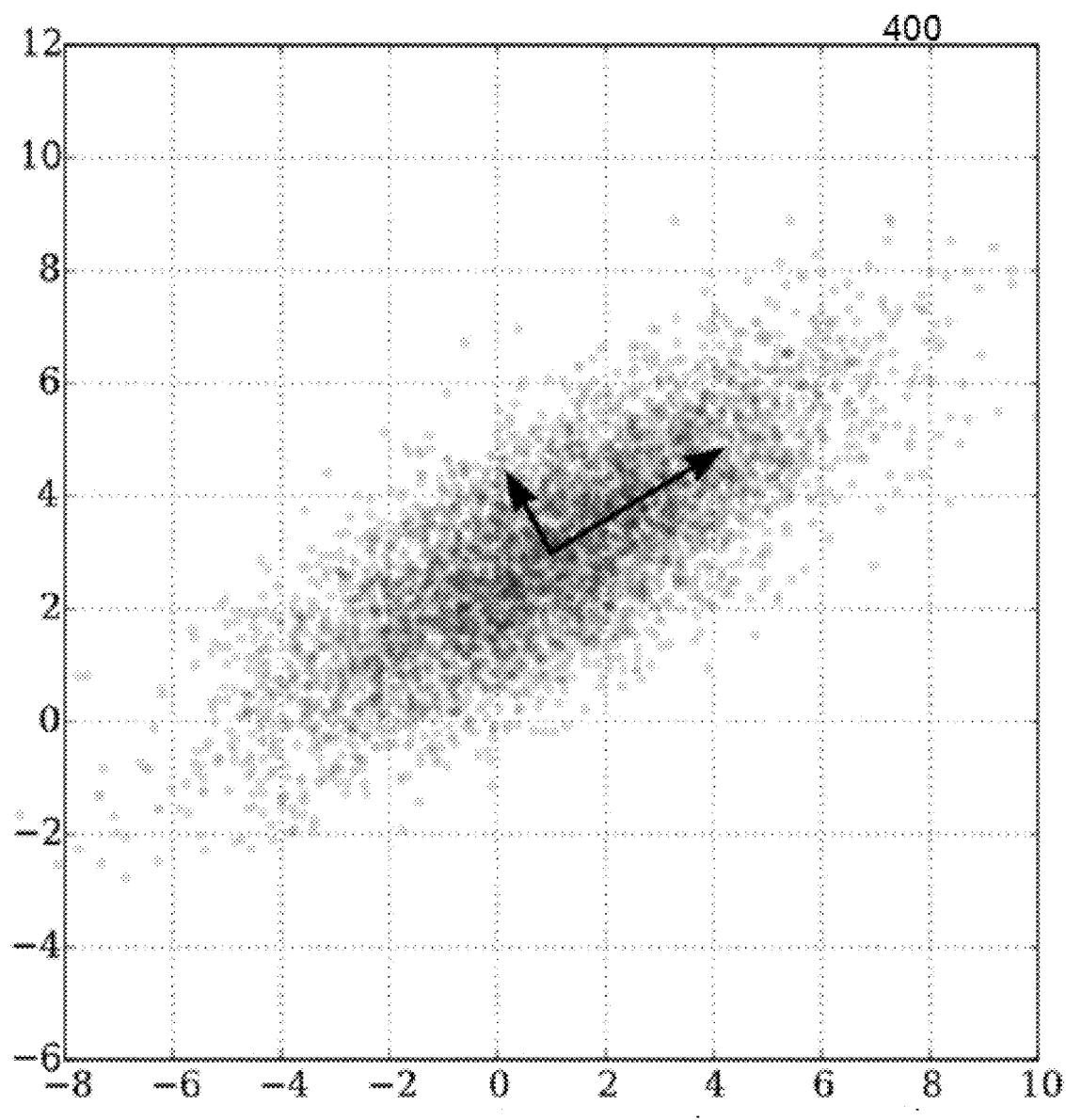
FIG. 4 is a principal component analysis of a multivariate Gaussian distribution, in accordance with one or more aspects of embodiments of the present invention.

FIG. 4 illustrates a PCA executed by one or more programs in certain embodiments of the present invention. As understood by one of skill in the art and illustrated in FIG. 4, the one or more programs execute a PCA of a multivariate Gaussian distribution centered at (1,3) with a standard deviation of 3 in roughly the (0.866, 0.5) direction and of 1 in the orthogonal direction 400. The vectors shown are the eigenvectors of the covariance matrix, scaled by the square root of the corresponding eigenvalue, and shifted so their tails are at the mean.

Figure 5:
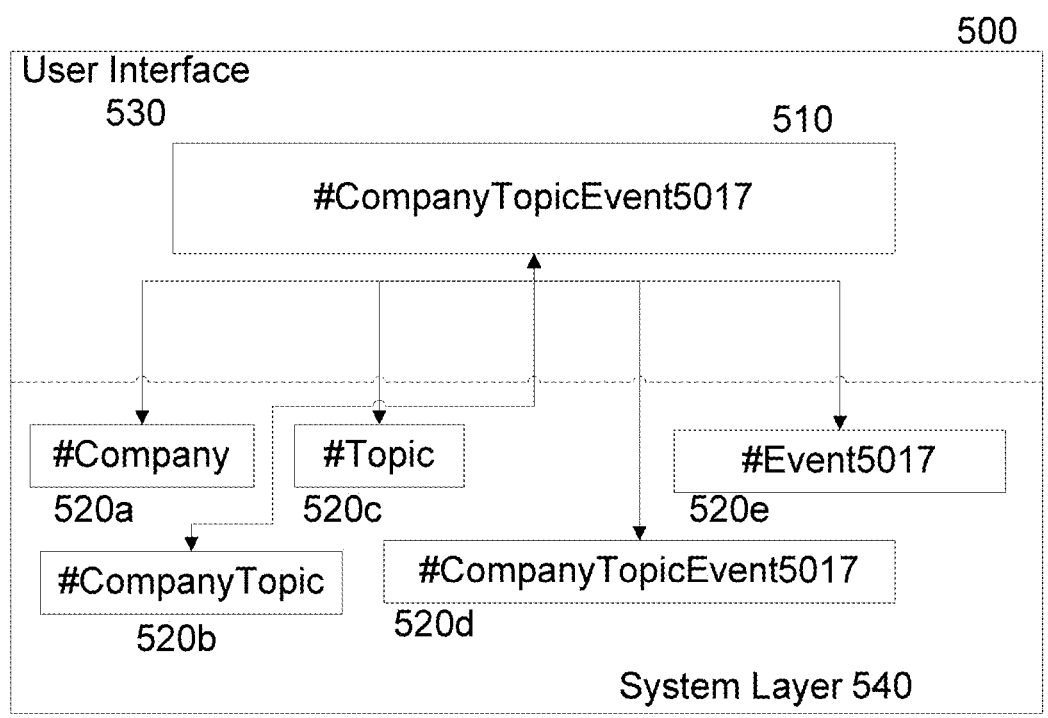
FIG. 5 is an illustration of certain aspects of embodiments of the present invention.

In an embodiment of the present invention, the one or more programs produce a template for use in generating sub-hashtags from prospective additional hashtags. The one or more programs generate this template based on completing the generation of sub-hashtags from a given hashtag, for example, #IBMCloudInterConnect2017. For example, FIG. 2 demonstrates how one or more programs generate sub-hashtags #IBM 220a, #IBMCloud 220b, #Cloud 220c, #InterConnect2017 220d, #IBMInterConnect2017 220e from hashtag #IBMCloudInterConnect2017 210. In an embodiment of the present invention, the one or more programs obtain the hashtag #IBMCloudInterConnect2017 and determine, for example, based on NLP, that the components of the hashtag comprise different types of terms, thus, the one or more programs map #IBMCloudInterConnect2017 to #CompanyTopicEventYear. Thus, the one or more programs generate sub-hashtags of this template hashtag: #Company, #CompanyTopic, #Topic, #CompanyEventYear, #EventYear. To simplify application of a template, in an embodiment of the present invention, when the one or more programs obtain a hashtag (e.g., FIG. 1, 110), the one or more programs convert the hashtag to a format of an existing template. FIG. 5 is an example of a template that can be created based on the example given in FIG. 2. For ease of understanding, FIG. 5 follows the same numbering schemes as FIG. 2.

FIG. 5 demonstrates how, in an embodiment of the present invention, one or more programs dynamically compile and create a combination or mashup hashtag, which can be split into sub-hashtags. One or more programs obtain a hashtag and revise the hashtag to fit a template, including but not limited to, the hashtag template 510 of FIG. 5. Based on generating a hashtag that conforms to the hashtag template 510, the one or more programs generate sub-hashtags from the sub-hashtag templates 520a-520e.

To generate the template approach of FIG. 5, in an embodiment of the present invention, the one or more programs obtain additional meta and/or perform additional contextual analysis, in order to package the components a hashtag (e.g., FIG. 2, 210) as a form of hashtag template (e.g., FIG. 5, 510). The one or more programs can apply templates generated as out of the box solutions in other fields and realms. In an embodiment of the present invention, the program code determines the efficacy of a given template based on executing a machine learning algorithm. The machine learning algorithm may score the inputs, numerically, on a given scale, to determine the efficacy of the template.

In some embodiments of the present invention, the one or more programs can utilize different parameters to determine which sub-hashtag to display to a given user. For example, the one or more programs may base the determination of the current interests of a user on the user's social media profile. However, in addition to looking at projecting interests of the user today, the one or more programs and/or the user could select a previous date/year upon which to base the user's interest projections. This historic selection could also be considered, based on the context of the post. For example, when a user posts a "throwback" photo, (e.g., a photo from a high school event) the one or more programs may display a sub-hashtag to another user, based on that user's interests at the time of the photo, rather than at present.

In some embodiments of the present invention, the one or more programs change the displayed hashtags for the initial user, based on changes in the profile (e.g., preferences, interests) of that user. When displaying a hashtag, the one or more programs may consider the timing of a photo/post as a factor in selecting the hashtags. The one or more programs may alter the hashtags of previous posts to reflect current interests of a user. Thus, when the user scrolls through his or her history of social media, the hashtags change dynamically, according to the user's current interests.

Embodiments of the present invention include a computer-implemented method, a computer program product, and a system that perform a method in which one or more programs executed by one or more processors, obtain, a hashtag over a communications connection. The one or more programs identify at least two linguistic components comprising the hashtag. The one or more programs generate at least two sub-hashtags, where each of the at least two sub-hashtags includes at least one linguistic component of the at least two linguistic components. The one or more programs obtain, over an Internet connection, via a user interface of a social media platform displayed on a first computing resource, an entry by a user including text and the hashtag. The one or more programs obtain, over the Internet connection, from a second computing resource accessing the social media platform, a request from a second user to access the entry, where the request includes parameters of a profile of the second user on the social media platform. The one or more programs determine that a sub-hashtag of the at least two sub-hashtags is most relevant to the third user, where the determining includes: inferring relationships between the parameters of the profile of the third user and the at least two linguistic components, and selecting the sub-hashtag associated with a more significant relationship of the inferred relationships. The one or more programs configure instructions to display a customized entry, where the customized entry includes the text and the relevant sub-hashtag for the second user. The one or more programs instruct, over the Internet connection, based on the instructions, the second computing resource to display the customized entry in the user interface of the second computing resource. In some embodiments of the present invention, based on receiving the instructing, the second computing resource displays the customized entry in the user interface of the second computing resource.

In one or more aspects of embodiments of the present invention, the hashtag includes a text string and the least two linguistic components each include a portion of the text string. In one or more aspects of embodiments of the present invention, at least two linguistic components of the least two linguistic components include a common portion of the text string.

In one or more aspects of embodiments of the present invention, identifying the at least two linguistic components includes executing a natural language processing algorithm of a text string comprising the hashtag. The natural language processing may include, but is not limited to, artificial intelligence and/or computational linguistics.

In one or more aspects of embodiments of the present invention, generating at least two sub-hashtags includes executing a principal component analysis to determine a related set of concepts based on the at least two linguistic components to generate sub-hashtags from the hashtag.

In one or more aspects of embodiments of the present invention, the method includes one or more programs obtaining, over the Internet connection, from a third computing resource accessing the social media platform, a request from a third user to access the entry, wherein the request comprises parameters of a profile of the third user on the social media platform. The one or more programs determined that a sub-hashtag of the at least two sub-hashtags is most relevant to the third user. This determination includes the one or more programs inferring relationships between the parameters of the profile of the third user and the at least two linguistic components, and selecting the sub-hashtag associated with a more significant relationship of the inferred relationships. The one or more programs configure instructions to display a customized entry for the third user, where the customized entry for the third user comprises the text and the relevant sub-hashtag for the third user. The one or more programs, over the Internet, instruct the second third computing resource to display the customized entry in the user interface of the third computing resource. In some embodiments of the present invention, based on based on receiving the instructing, the third computing resource displays this customized entry in the user interface of the third computing resource.

In one or more aspects of embodiments of the present invention, the relevant sub-hashtag for the second user and the relevant sub-hashtag for the third user include a common sub-hashtag of the at least two hashtags. In one or more aspects of embodiments of the present invention, the relevant sub-hashtag for the second user and the relevant sub-hashtag for the third user include different sub-hashtags of the at least two hashtags.

In one or more aspects of embodiments of the present invention, where determining that a sub-hashtag of the at least two sub-hashtags is most relevant to the second user includes identifying the second user.

In one or more aspects of embodiments of the present invention, the parameters of the profile include historical entries of the second user on the social media platform during a pre-defined period of time.

In one or more aspects of embodiments of the present invention, the one or more programs also identify historical entries by the second user on the social media platform with historical hashtags similar to the hashtag. Additionally, the one or more programs update the historical hashtags to the sub-hashtag, wherein a subsequent user accessing an entry of the historical entries views the sub-hashtag. In some embodiments of the present invention, this update include the one or more programs replacing each of the historical hashtags with the sub-hashtag.

Referring now to FIG. 6, a schematic is pictured that is an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more programs generating the sub-hashtags can be understood as executing on a cloud computing node 10 (FIG. 6) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
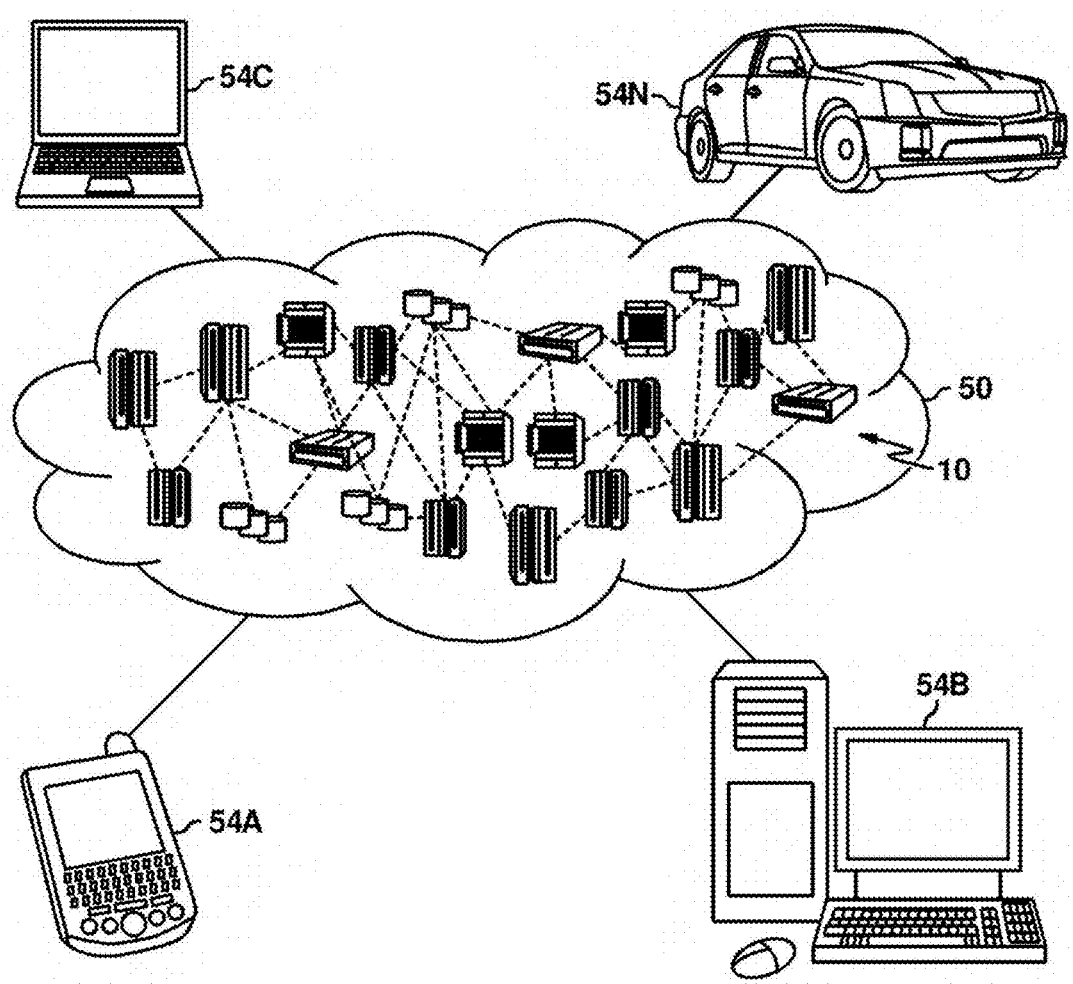
FIG. 7 depicts a cloud computing environment according to embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
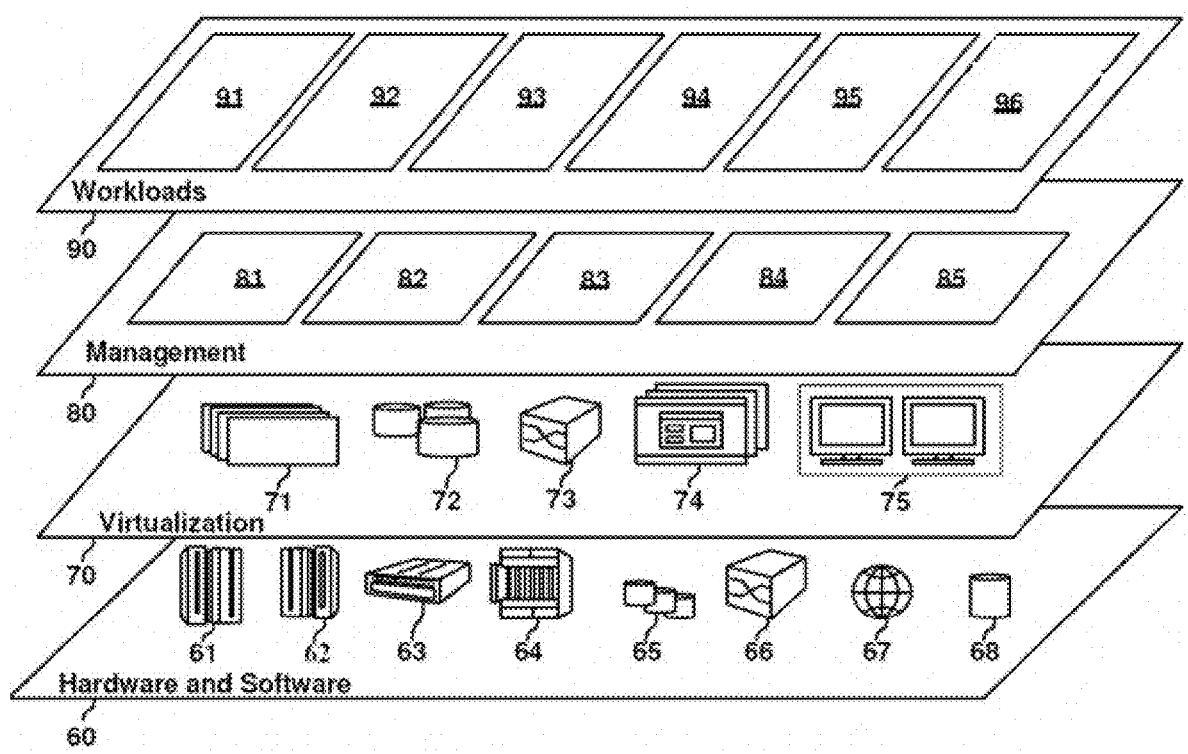
FIG. 8 depicts abstraction model layers according to embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating and displaying dynamic sub-hashtags 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to illustrate various aspects and the practical application, and to enable others of ordinary skill in the art to understand various embodiments with various modifications as are suited to the particular use contemplated.

What is claimed is:

1. A computer-implemented method, comprising:
    identifying, by the one or more processors, at least two linguistic components comprising a hashtag, wherein the identifying the at least two linguistic components comprises executing a natural language processing algorithm of a text string comprising the hashtag;
    generating, by the one or more processors, at least two sub-hashtags, wherein each of the at least two sub-hashtags comprises at least one linguistic component of the at least two linguistic components;
    obtaining, by the one or more processors, over an Internet connection, via a user interface of a social media platform displayed on a first computing resource, an entry by a user comprising text and the hashtag;
    obtaining, by the one or more processors, over the Internet connection, from a second computing resource accessing the social media platform, a request from a second user to access the entry, wherein the request comprises parameters of a profile of the second user on the social media platform;
    determining, by the one or more processors, that a sub-hashtag of the at least two sub-hashtags is most relevant to a third user; and
    configuring, by the one or more processor, instructions to display a customized entry, wherein the customized entry comprises the text and the relevant sub-hashtag for the second user.

2. The computer-implemented method of claim 1, further comprising:
    obtaining, by the second computing resource, the instructions to display the customized entry; and
    displaying, by the second computing resource, the customized entry in the user interface of the second computing resource.

3. The computer-implemented method of claim 1, wherein the hashtag comprises a text string and the least two linguistic components each comprise a portion of the text string.

4. The computer-implemented method of claim 3, wherein at least two linguistic components of the least two linguistic components comprise a common portion of the text string.

5. The computer-implemented method of claim 1, further comprising:
instructing, by the one or more processors, over the Internet connection, based on the instructions, the second computing resource to display the customized entry in the user interface of the second computing resource.

6. The computer-implemented method of claim 1, the natural language processing selected from the group consisting of: artificial intelligence and computational linguistics.

7. The computer-implemented method of claim 1, wherein the generating at least two sub-hashtags comprises executing a principal component analysis to determine a related set of concepts based on the at least two linguistic components to generate sub-hashtags from the hashtag.

8. The computer-implemented method of claim 1, further comprising:
obtaining, by the one or more processors, over the Internet connection, from a third computing resource accessing the social media platform, a request from a third user to access the entry, wherein the request comprises parameters of a profile of the third user on the social media platform;
determining, by the one or more processors, that a sub-hashtag of the at least two sub-hashtags is most relevant to the third user; and
configuring, by the one or more processor, instructions to display a customized entry for the third user, wherein the customized entry for the third user comprises the text and the relevant sub-hashtag for the third user.

9. The computer-implemented method of claim 8, further comprising:
instructing, by the one or more processors, over the Internet connection, based on the instructions, the second computing resource to display the customized entry for the third user in the user interface of the third computing resource.

10. The computer-implemented method of claim 8, wherein the relevant sub-hashtag for the second user and the relevant sub-hashtag for the third user comprise a common sub-hashtag of the at least two hashtags.

11. The computer-implemented method of claim 9, wherein the relevant sub-hashtag for the second user and the relevant sub-hashtag for the third user comprise different sub-hashtags of the at least two hashtags.

12. The computer-implemented method of claim 1, wherein the determining that a sub-hashtag of the at least two sub-hashtags is most relevant to the second user further comprises identifying the second user.

13. The computer-implemented method of claim 1, the parameters of the profile comprises historical entries of the second user on the social media platform during a predefined period of time.

14. The computer-implemented method of claim 1, further comprising:
identifying, by the one or more processors, historical entries by the second user on the social media platform with historical hashtags similar to the hashtag; and
updating, by the one or more processors, the historical hashtags to the sub-hashtag, wherein a subsequent user accessing an entry of the historical entries views the sub-hashtag.

15. The computer-implemented method of claim 14, wherein the updating the historical hashtags comprises replacing each of the historical hashtags with the sub-hashtag.

16. A computer program product comprising:
a computer readable storage medium readable by one or more processors and storing instructions for execution by the one or more processors for performing a method comprising:
obtaining, by the one or more processors, over a communications connection, a hashtag;
identifying, by the one or more processors, at least two linguistic components comprising the hashtag, wherein the identifying the at least two linguistic components comprises executing a natural language processing algorithm of a text string comprising the hashtag;
generating, by the one or more processors, at least two sub-hashtags, wherein each of the at least two sub-hashtags comprises at least one linguistic component of the at least two linguistic components;
obtaining, by the one or more processors, over an Internet connection, via a user interface of a social media platform displayed on a first computing resource, an entry by a user comprising text and the hashtag;
obtaining, by the one or more processors, over the Internet connection, from a second computing resource accessing the social media platform, a request from a second user to access the entry, wherein the request comprises parameters of a profile of the second user on the social media platform;
determining, by the one or more processors, that a sub-hashtag of the at least two sub-hashtags is most relevant to a third user; and
configuring, by the one or more processor, instructions to display a customized entry, wherein the customized entry comprises the text and the relevant sub-hashtag for the second user.

17. The computer program product of claim 16, wherein the hashtag comprises a text string and the least two linguistic components each comprise a portion of the text string.

18. The computer program product of claim 17, wherein at least two linguistic components of the least two linguistic components comprise a common portion of the text string.

19. The computer program product of claim 17, further comprising:
instructing, by the one or more processors, over the Internet connection, based on the instructions, the second computing resource to display the customized entry in the user interface of the second computing resource.

20. A system comprising:
a memory;
one or more processors in communication with the memory; and
program instructions executable by the one or more processors via the memory to perform a method, the method comprising:
obtaining, by the one or more processors, over a communications connection, a hashtag;
identifying, by the one or more processors, at least two linguistic components comprising the hashtag, wherein the identifying the at least two linguistic components comprises executing a natural language processing algorithm of a text string comprising the hashtag;

generating, by the one or more processors, at least two sub-hashtags, wherein each of the at least two sub-hashtags comprises at least one linguistic component of the at least two linguistic components;

obtaining, by the one or more processors, over an Internet connection, via a user interface of a social media platform displayed on a first computing resource, an entry by a user comprising text and the hashtag;

obtaining, by the one or more processors, over the Internet connection, from a second computing resource accessing the social media platform, a request from a second user to access the entry, wherein the request comprises parameters of a profile of the second user on the social media platform;

determining, by the one or more processors, that a sub-hashtag of the at least two sub-hashtags is most relevant to a third user; and configuring, by the one or more processor, instructions to display a customized entry, wherein the customized entry comprises the text and the relevant sub-hashtag for the second user.

* * * * *